United States Patent

Doriguzzi et al

[11] 4,025,164
[45] May 24, 1977

[54] LIQUID CRYSTAL DISPLAY DEVICE FOR COLORED DISPLAY OF INFORMATION WITH A SELECTIVE POLARIZER

[75] Inventors: Rino Doriguzzi, Dottingen; Terry J. Scheffer, Wettingen, both of Switzerland

[73] Assignee: BBC Brown Boveri & Company Limited, Baden, Switzerland

[22] Filed: Feb. 24, 1976

[21] Appl. No.: 660,986

[30] Foreign Application Priority Data
Mar. 17, 1975 Switzerland .................. 3352/75

[52] U.S. Cl. .................. 350/160 LC; 350/148; 350/150; 350/154
[51] Int. Cl.² .......................................... G02F 1/13
[58] Field of Search ..... 350/148, 150, 154, 160 LC

[56] References Cited
UNITED STATES PATENTS

| 3,806,227 | 4/1974 | Greubel et al. | 350/150 |
| 3,972,587 | 8/1976 | Scheffer | 350/150 |

OTHER PUBLICATIONS

Scheffer: "New Multicolor liquid crystal displays that use a twisted-nematic electro-optical cell," J. App. Phys., vol. 44, pp. 4799–4803, Nov. 1973.

*Primary Examiner*—Edward S. Bauer
*Attorney, Agent, or Firm*—Oblon, Fisher, Spivak, McClelland & Maier

[57] ABSTRACT

A liquid crystal display device for the colored display of information with a reflector and a twisted nematic liquid crystal cell placed between a linear and a selective polarizer is disclosed. The selective polarizer is disposed in front of the twisted nematic liquid crystal cell and the linear polarizer is disposed between the twisted nematic liquid crystal cell and the reflector.

14 Claims, 6 Drawing Figures

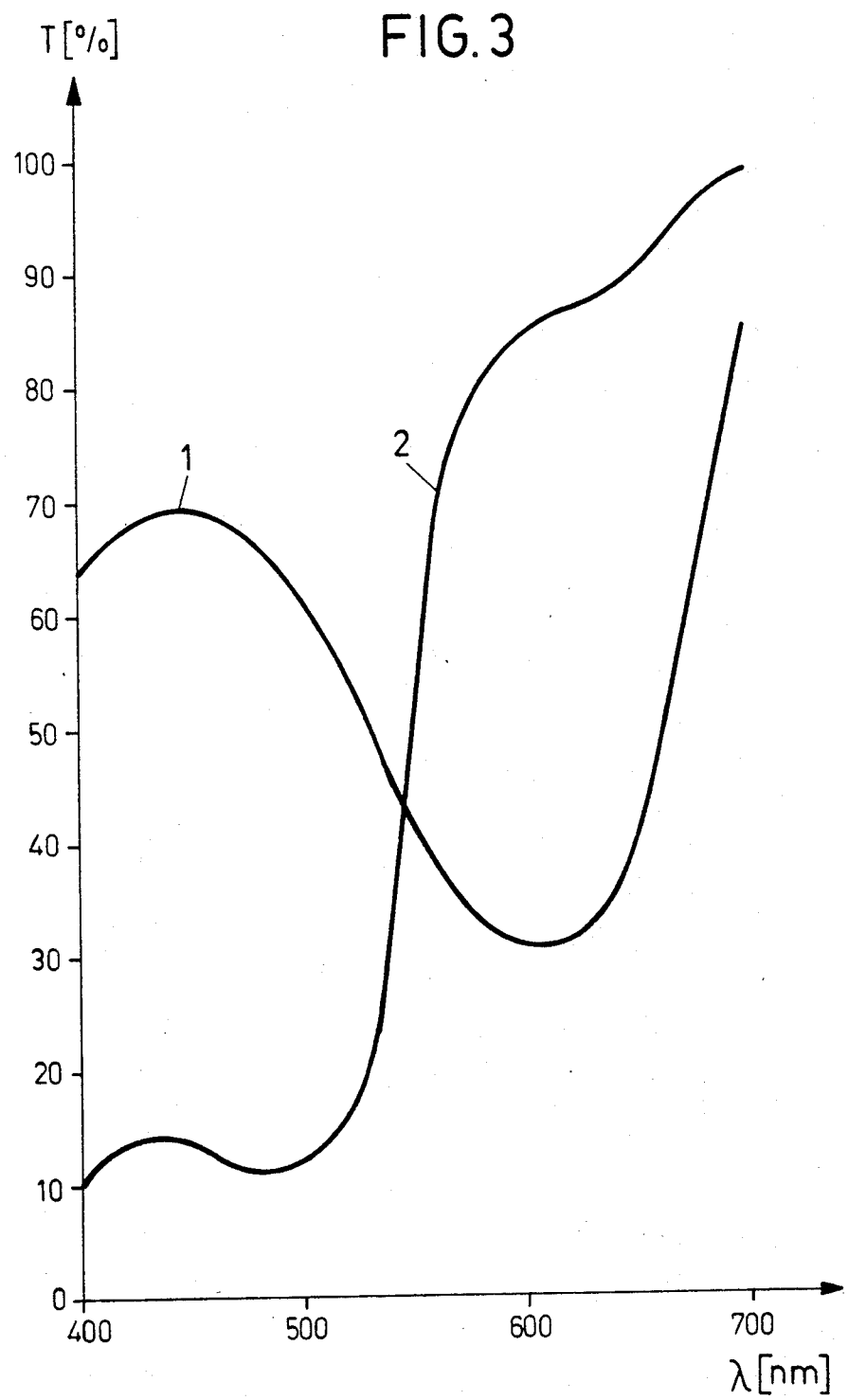

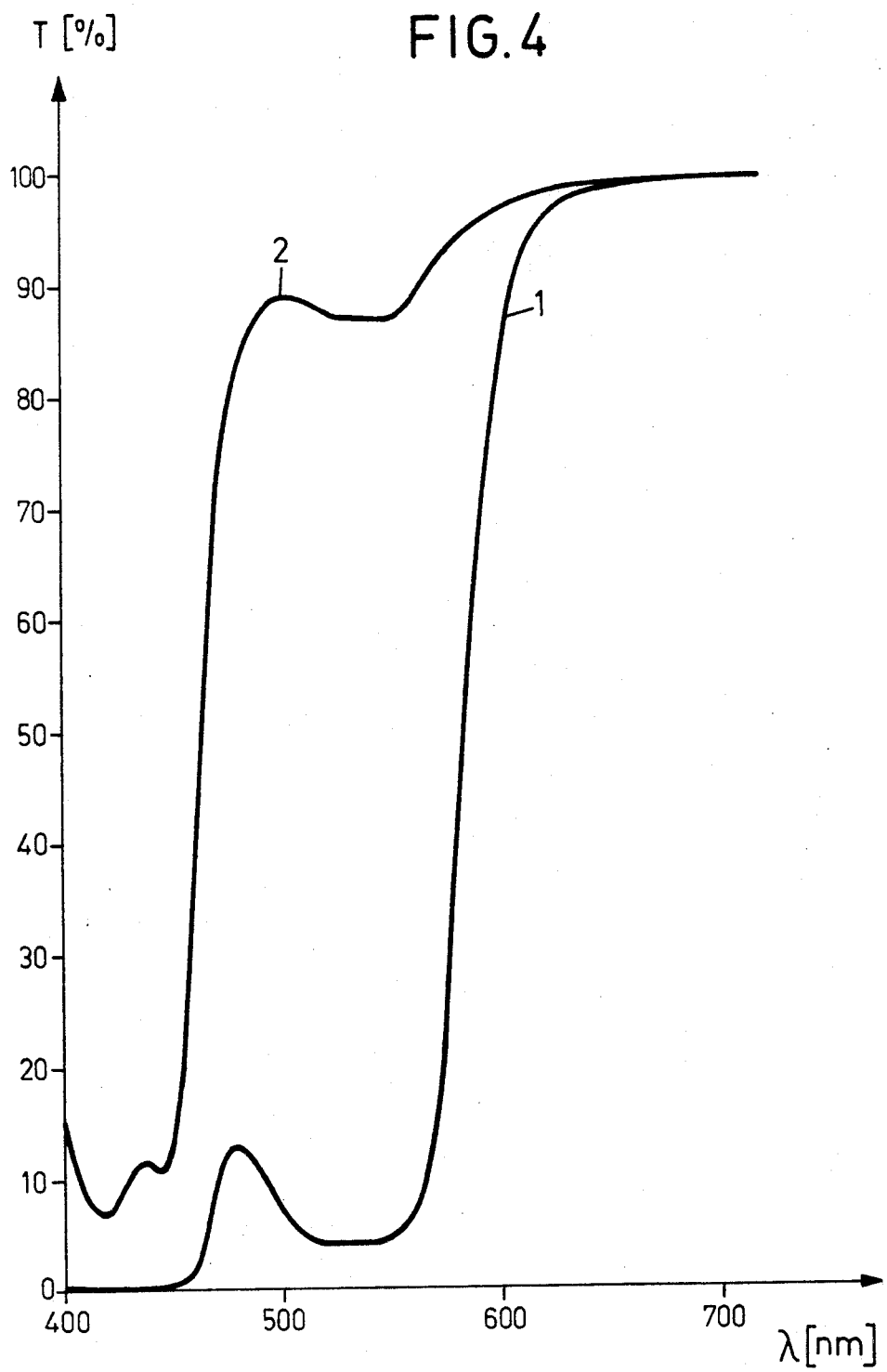

LIQUID CRYSTAL DISPLAY DEVICE FOR COLORED DISPLAY OF INFORMATION WITH A SELECTIVE POLARIZER

BACKGROUND OF THE INVENTION

1. Field of the Invention

The present invention is concerned with a liquid crystal display device for colored display of information with a reflector and a twisted nematic liquid crystal cell located between a linear and a selective polarizer and a method of fabricating the same.

2. Description of the Prior Art

Devices of the type mentioned are known from DT-OS No. 2,329,618. In the display devices disclosed there, the selective polarizer is situated between the reflector and the twisted nematic liquid crystal cell and consists of polarizer sheets in which various pleochroic dyes are embedded in an oriented manner. The two sheets here are rotated with respect to one another. The linear polarizer is disposed between the twisted nematic liquid crystal cell and the light source or the observer. In such devices, however, the controlled segments have dark borders.

SUMMARY OF THE INVENTION

It is an aim of the invention, therefore, to offer a liquid crystal display device for colored display of information with a selective polarizer having the advantages of the known display device but distinguished in addition by a uniformly illuminated, bright display surface with strong color contrast.

This aim of the invention is satisfied by locating the selective polarizer in front of the twisted nematic liquid crystal cell and the linear polarizer between the twisted nematic liquid crystal cell and the reflector.

Such devices display the information on a surprisingly bright and uniformly illuminated display surface. The color effect of the display is greatly enhanced by the brightness and uniform illumination of the display face.

It is extremely advantageous to use a selective polarizer consisting of at least two sheets with their preferred directions turned at most 90° to one another and having dichroic dyes imbedded in the sheets. Devices provided with such selective polarizers are distinguished by splendid color rendition, especially when suitable dichroic dyes are used. By preferred direction is meant here a preferred direction of the optimum anisotropy, which in polarizing sheets produced by stretching runs parallel to the direction of stretching.

It is also highly recommended that the device of the invention be furnished with a selective polarizer having only a single polarizing sheet in which, however, are embedded several dyes, of which at least one is dichroic. Such a device is simple in construction and therefore is also economical to produce. Nevertheless, it is still distinguished by exceptionally high brightness of the display face, since the selective polarizer consists of only one light-absorbing polarizer sheet.

If a single-color display is desired, like colored symbols on a white (colorless) background or white (colorless) symbols on a colored background, it is sufficient to use a selective polarizer of only one polarizing sheet in which only one dichroic dye is embedded.

The display face of the device of the invention is outstandingly brilliant in color when the dichroic dyes tabulated at the end of the specification are used in the selective polarizer.

The foregoing and other objects are attained in accordance with one aspect of the present invention through the provision of a liquid crystal display device for the colored display of information with a reflector and a twisted nematic liquid crystal cell placed between a linear polarizer and a selective polarizer wherein the selective polarizer is disposed in front of the twisted nematic liquid crystal cell and the linear polarizer is disposed between the twisted nematic liquid crystal cell and the reflector.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 3 gives the transmission spectra of a selective polarizer with a blue and an orange colored polarizing sheet, the preferred directions of the stretching of which are turned 90° to one another, the direction of vibration of the incident polarized light in curve 1 being parallel to the preferred direction of the blue polarizing sheet and in curve 2, to that of the orange polarizing sheet.

FIG. 4 gives the transmission spectra of a selective polarizer which has only one polarizing sheet, a red and yellow colored polarizing sheet, where in curve 1 the direction of vibration of the incident polarized light is parallel to the preferred direction of the stretching of the polarizing sheet and in curve 2 is perpendicular thereto.

DETAILED DESCRIPTION OF THE PREFERRED EMBODIMENTS

Figure 1A:
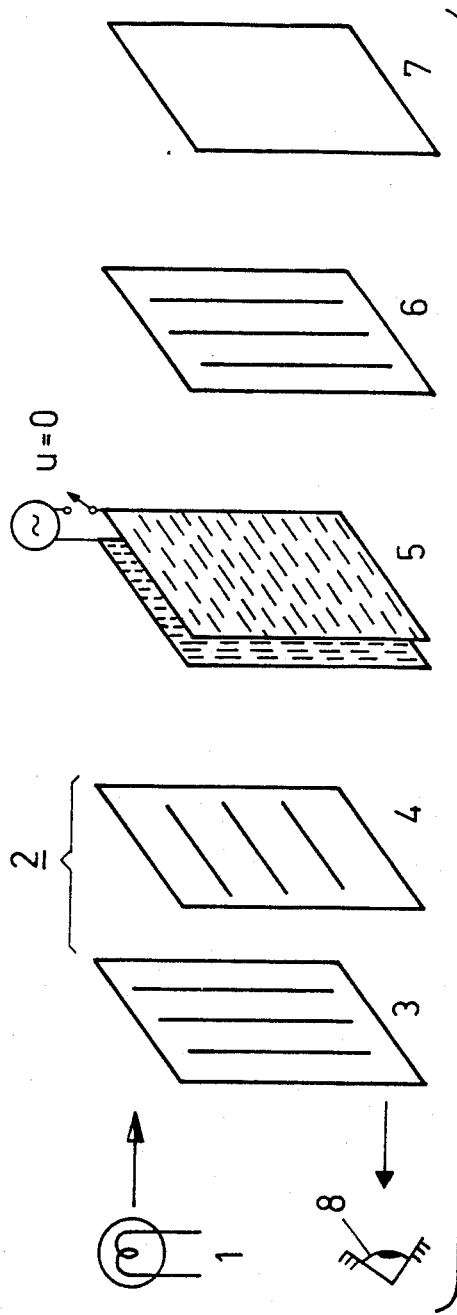
FIGS. 1a and 1b show the construction and ray path of a device conforming to the invention, the color observed in design a) being determined essentially by the polarizer sheet 3, and the color observed in design b) being determined essentially by the polarizer sheet 4.
Figure 1B:
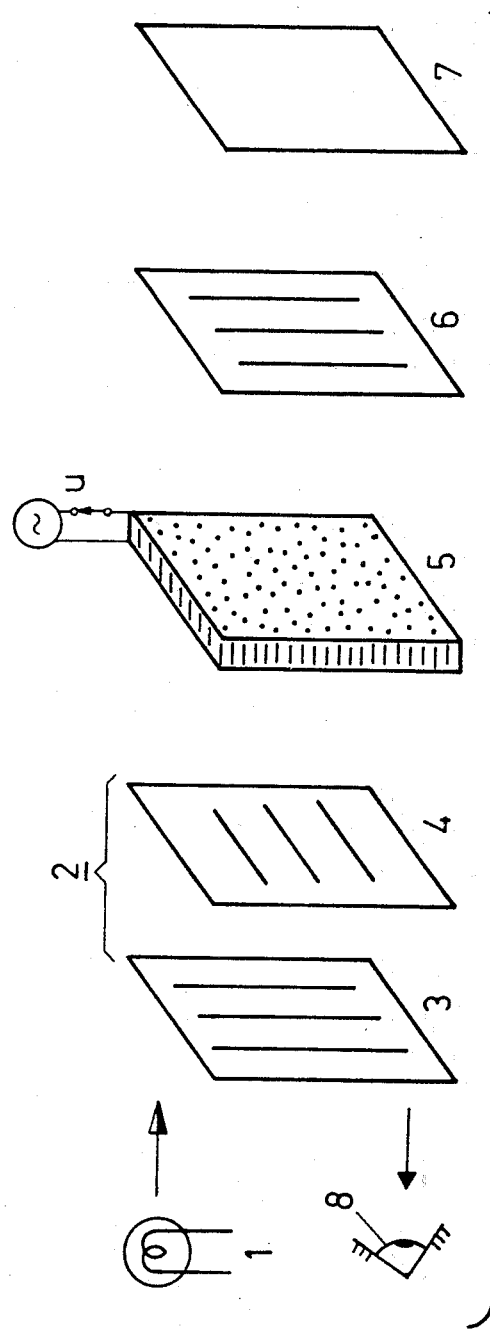

Referring now to the drawings, wherein like reference numerals designate identical or corresponding parts throughout the several views, and more particularly to FIG. 1 thereof, in FIGS. 1a and 1b there is a light source 1, the white unpolarized light of which passes through a selective polarizer 2 composed of two polarizing sheets 3 and 4, whereby it is split into two differently colored beams polarized perpendicularly to one another. These two beams then pass through the twisted nematic liquid crystal cell and one or the other is absorbed in the adjacent neutral linear polarizer 6, depending on whether the twisted nematic liquid crystal cell is switched on or off. The colored beam which is not absorbed is reflected at reflector 7, passes unhindered through the neutral polarizer 6, the twisted nematic liquid crystal cell 5 and the selective polarizer 2 and is perceived as colored light by the observer 8.

The selective polarizer 2 comprises the two polarizing sheets 3 and 4 each consisting of polyvinylalcohol (PVA) and an embedded dichroic dye. The polarizing sheets are made by stretching and dyeing a PVA film.

Figure 2A:
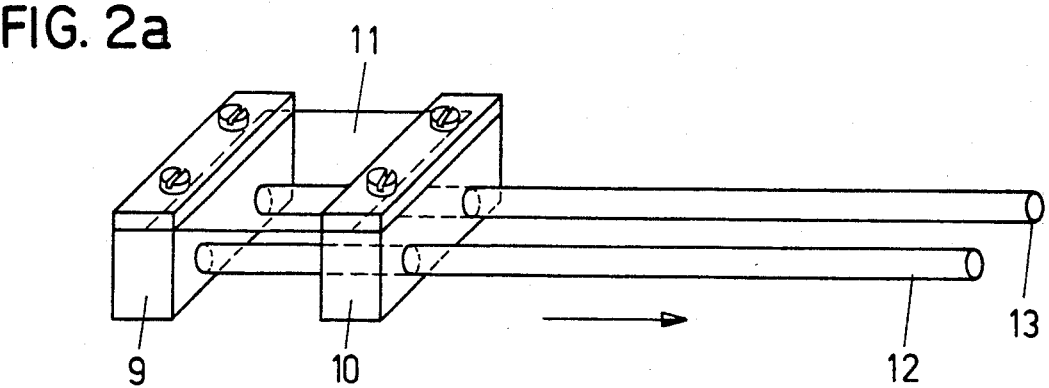
FIGS. 2a and 2b show a device for producing colored and stretched polarizing sheets.
Figure 2B:
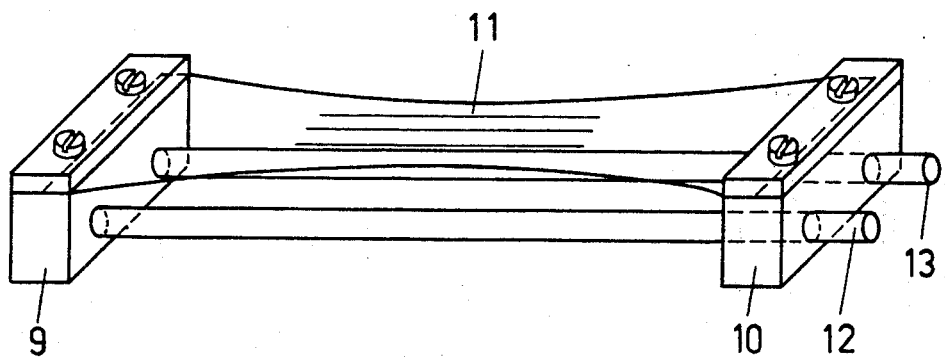

A device for stretching such a PVA film is shown in FIGS. 2a and b. Here the reference numbers 9 and 10 indicate the opposed clamping members in which an approximately 30 mm long, 60 mm wide and 50 μ thick PVA film 11 is clamped. The member 9 is attached on one side to two parallel guide-rods 12 and 13, while the member 10 slides along the rods. The stretching device of FIG. 2a is placed in a cold water bath and the PVA film stretched to about six or seven times its original length by slow movement of the clamping member 10 in the direction of the arrow for about three hours. The appearance of such a stretched film 11 is indicated in FIG. 2b. By the stretching of the film 11 in the direction of the arrow, it acquires a preferred direction, which is indicated by the parallel lines on the film 11 and on the sheets 3 and 4 of the device in FIGS. 1a and b.

By dipping the device of FIG. 2b for 0.5 to 5 minutes in a dye bath with about 0.1 weight percent of dichroic dye there is produced a more or less strong, depending on the dye used, embedding of dye molecules in the stretched PVA film. After being washed with distilled solvent, usually water, and subsequent drying in air, the colored PVA film is perfectly rigid and can then be removed from the device and cut to size for polarizer sheets.

The twisted nematic liquid crystal cell 5 corresponds in structure and operation to that in DT-OS No. 2,158,563 and therefore is shown only schematically in FIGS. 1a and b by two transparent electrodes, the directions of which are turned 90° to one another, as well as by a few molecules of the liquid-crystal substance indicated by dashes. A control voltage U is applied to the electrodes to establish the electric field for orienting the liquid-crystal molecules.

The polarizer 6 is a neutral, non-color-selective linear polarizer.

The reflector 7 consists of an aluminum or silver coating on a supporting plate.

In a first embodiment of the device after FIGS. 1a and b, a blue polarizing sheet 3 and an orange polarizing sheet 4 were used in the selective polarizer. CIBA cuprophenyl blue GL was embedded in sheet 3 as the dichroic dye and Searle benzorubin R in sheet 4. The two sheets were so arranged in the display device that their preferred directions produced by stretching the PVA film were turned 90° to one another and the preferred direction of sheet 3 ran parallel to that of the linear polarizer 6.

In FIG. 1a, the device allows blue light to reach the observer and in FIG. 1b, orange light. Curves 1 and 2 of FIG. 3 give the spectral distribution of the light in the two cases.

This behavior is explained by the physical properties of the selectively absorbing polarizing sheets 3 and 4. If the direction of polarization of the light corresponds to that of the transition moment in the selectively absorbing sheet, then the wavelength corresponding to the transition is absorbed. However, if the direction of polarization of the light and the transition moment are perpendicular to one another, there is no absorption and the entire spectrum of the incident light is transmitted.

Unpolarized white light passes through the polarizer 2 and is thereby split into a vertically polarized blue beam and a horizontally polarized orange beam. In the voltage-off condition (FIG. 1a), the polarization directions of the two beams are rotated through 90° in passing through the twisted nematic liquid crystal cell 5 so that now the blue beam is horizontally polarized and the orange beam is vertically polarized. The orange beam is totally absorbed by the neutral polarizer 6 while the blue beam is transmitted. The blue beam is then reflected at the mirror 7 and transmitted by the neutral polarizer 6. Upon passing through the twisted nematic liquid crystal cell 5, its direction of polarization is again rotated by 90°, thus becoming vertical. The blue beam then passes unhindered through the selective polarizer 2 and is perceived by the observer 8 as blue light.

On the other hand, if a potential of a few volts is applied to the twisted nematic liquid crystal cell, the liquid-crystal molecules orient themselves in such a way that the planes of polarization of the colored light beams are not rotated and now the blue beam remains vertically polarized and is completely absorbed in the neutral polarizer 6 while the orange beam passes unhindered through neutral polarizer 6. The orange beam is reflected at the mirror 7, passes unhindered through the neutral polarizer 6, the twisted nematic liquid crystal cell 5, the selective polarizer 2 and is perceived by the observer 8 as orange light.

The complementary effect can be produced by rotating either the selective polarizer 2 or the linear polarizer 6 through 90°.

In a display device having neighboring regions in its twisted nematic liquid crystal cell with and without an electric field present, information can thus be displayed in at least two colors.

A further embodiment of the invention consists of a device for the two-color display of information which has for its selective polarizer 3 just a single polarizer sheet, in which, however, at least two different dichroic dyes are embedded.

Such sheets can be produced as previously described by stretching in a cold water bath and then embedding dichroic dye. Two-color sheets are obtained either by treatment in a dye bath containing two dyes or by successive coloring in two dye baths, each containing one of the dyes.

FIG. 4 gives the transmission spectra of a selective polarizer with a single polarizing sheet in which, however, Hochst diamine red 8B was embedded in a first 0.1% dye bath and Fluka quinoline yellow in a second 0.6% bath. Here curve 1 shows the transmission as a function of the wavelength λ in (μm) of incident white polarized light, the direction of polarization of which is parallel to the preferred direction of the stretching of the PVA film. Curve 2 is again the transmission curve of the sheet when the preferred direction of the stretching of the PVA film and the direction of polarization of the incident light are mutually perpendicular.

If now such a selective polarizer 2 is arranged in the display device of FIGS. 1a and b in place of the two polarizing sheets 3 and 4 so that its preferred direction due to stretching is parallel to the preferred direction of stretching of the polarizer 6, thus vertical, then the observer sees red light with no voltage applied to the twisted nematic liquid crystal cell and yellow light when the voltage U is applied.

The complementary effect can be produced by rotating the selective polarizer 2 or the linear polarizer 6 by 90°.

Further investigation showed that not only the previously described dyes CIBA cuprophenyl blue GL, Searle benzorubin R, Hochst diamine red 8B and Fluka quinoline yellow can be used to advantage in the display device of the invention, the following listed dyes are also particularly suited to it. This selection from among the abundance of known dyes is especially favorable since the dye is not only embedded in the PVA film for a useful color effect, but beyond that, the embedding of the dye in the stretched PVA film must also give it dichroic properties.

| Trade Name | Manufacturer and Manufacturer's Number | | Color Index: Constitution Number | Color Index: Generic Number | |
|---|---|---|---|---|---|
| | BLUE | | | | |
| Benzo azurine G | Searle | 50 | 24,140 | direct blue | 8 |
| Direct brilliant blue C | Searle | 225 | 24,340 | direct blue | 10 |
| Trypan blue | Chroma | 1B187 | 23,850 | direct blue | 14 |
| Chicago blue RW | Chroma | 1A034 | 24,280 | direct blue | 22 |
| Chlorantine deep blue 4GL | Searle | 867 | 34,200 | direct blue | 78 |
| Sirius super blue BL | Searle | 1249 | 34,215 | direct blue | 81 |
| Sirius super blue GL | Searle | 1251 | 23,160 | direct blue | 84 |
| Solophenyl blue FGL | CIBA | 685 | — | direct blue | 85 |
| Solophenyl brilliant blue BL | Searle | 1476 | 51,300 | direct blue | 106 |
| Benzo copper deep blue F3GL | Searle | 1273 | 28,350 | direct blue | 149 |
| Cuprophenyl blue GL | CIBA | 912 | 35,775 | direct blue | 159 |
| Solophenyl marine blue ABL | CIBA | 19 | — | direct blue | 260 |
| Benzo copper deep violet F3BL | Searle | 1279 | 25,420 | direct violet | 80 |
| Indigo carmine | Searle | 149 | 73,015 | acid blue | 74 |
| Levano light cyanine 5RN | Chroma | 1E232 | 26,400 | acid blue | 120 |
| Janus green B | Searle | 183 | — | basic dye | |
| Renol black | Searle | 463 | 30,245 | direct black | 4 | hz,1/42

| Trade Name | Manufacturer and Manufacturer's Number | | Color Index: Constitution Number | Color Index: Generic Number | |
|---|---|---|---|---|---|
| | RED | | | | |
| Congo red | Chroma | 1A094 | 22,120 | direct red | 28 |
| Benzamine rubin FDG | Searle | 1284 | 28,260 | direct red | 150 |
| Procion brilliant red M-2B | Serva | 33516 | 18,158 | reactive red | 1 |
| Maxilon brilliant red 4G | CIBA | 953 | — | basic red | 14 |
| Biebrich scarlet | Chroma | 1A398 | 26,905 | acid red | 66 |

| Trade Name | Manufacturer and Manufacturer's Number | | Color Index: Constitution Number | Color Index: Generic Number | |
|---|---|---|---|---|---|
| | GREEN | | | | |
| Benzo brilliant green L3G | Searle | 1283 | 32,030 | direct green | 3 |
| Dianil green B | Searle | 84 | 30,315 | direct green | 8 |
| Chlorantine deep green BLL | Searle | 541 | 34,045 | direct green | 26 |
| Sirius super green BB | Searle | 1246 | 34,270 | direct green | 33 |
| Sirius super green BTL | Searle | 1104 | 27,970 | direct green | 34 |
| Azo dark green | Searle | 832 | 20,495 | acid green | 20 |
| | YELLOW | | | | |
| Benzo copper deep yellow GRL | Searle | 1281 | 29,020 | direct yellow | 33 |
| Durazol flavine R | Searle | 1461 | 29,025 | direct yellow | 50 |
| Diazol light yellow RS | Searle | 1477 | 29,030 | direct yellow | 51 |
| Solophenyl yellow A3GL | CIBA | 974 | — | direct yellow | 98 |
| Solophenyl yellow ARL | CIBA | 405 | — | direct yellow | 106 |
| Maxilon yellow 3GL | CIBA | 718 | — | basic yellow | 11 |
| Anthracene yellow C | Chroma | 1A010 | 25,100 | mordant yellow | 16 |
| Solochrome orange GRS | Searle | 335 | 26,520 | mordant orange | 6 |
| Procion yellow M-4R | Serva | 33519 | — | reactive orange | 1 |

| Trade Name | Manufacturer and Manufacturer's Number | | Color Index: Constitution Number | Color Index: Generic Number | |
|---|---|---|---|---|---|
| | ORANGE | | | | |
| Stilbene orange | Searle | 465 | 23,380 | direct orange | 7 |
| Sirius orange G | Searle | 1254 | 29,050 | direct orange | 49 |
| Cuprophenyl orange 3GL | CIBA | 442 | — | direct orange | 105 |
| Benzo rubin R | Searle | 1479 | 22,205 | direct red | 43 |
| Benzo copper deep red GGL | Searle | 1272 | 24,565 | direct red | 180 |
| Benzo orange brown GR | Searle | 1457 | 30,135 | direct brown | 5 |
| Methyl orange | Merck | 1322 | 13,025 | acid orange | 52 |
| | VIOLET | | | | |
| Trisulphon violet 2B | Searle | 1441 | 24,080 | direct violet | 1 |
| Congo violet | Searle | 274 | 22,500 | direct red | 4 |
| | BROWN | | | | |
| Benzo deep brown NZ | Chroma | 1B005 | 35,660 | direct brown | 31 |
| | BLACK | | | | |
| Cuprophenyl gray | CIBA | 837 | 36,250 | direct black | 122 |

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A liquid crystal display device for the colored display of information with a reflector and a twisted nematic liquid crystal cell placed between a linear polarizer and a selective polarizer wherein the selective polarizer is disposed in front of the twisted nematic liquid crystal cell and the linear polarizer is disposed between the twisted nematic liquid crystal cell and the reflector.

2. A device as in claim 1 wherein the selective polarizer comprises at least two polarizing sheets, the preferred directions of which are turned at most 90° to one another and each of which contains an embedded dichroic dye.

3. A device as in claim 2 wherein the dichroic dye is at least one of the following listed dyes:

Blue dyes: benzo azurine G, direct brilliant blue C, trypan blue, Chicago blue RW, chlorantine deep blue 4 GL, Sirius super blue BL, Sirius super blue GL, solophenyl blue FGL, solophenyl brilliant blue BL, benzo copper deep blue F3GL, cuprophenyl blue GL, solophenyl marine blue ABL, benzo copper deep violet F3BL, indigo carmine, Levano light cyanine 5RN, Janus green B, renol black;
Red dyes: Congo red, benzamine rubin FDG, Procion brilliant red M-2B, Maxilon brilliant red 4G, Biebrich scarlet;
Green dyes: benzo brilliant green L3G, dianil green B, chlorantine deep green BLL, Sirius super green BB, Sirius super green BTL, azo dark green;
Yellow dyes: benzo copper deep yellow GRL, durazol flavine F, diazol light yellow RS, solophenyl yellow A3GL, solophenyl yellow ARL, Maxilon yellow 3 GL, anthracene yellow C, solochrome orange GRS, Procion yellow M-4R;
Orange dyes: stilbene orange, Sirius orange G, cuprophenyl orange 3GL, benzo rubin R, benzo copper deep red GGL, benzo orange brown GR, methyl orange;
Violet dyes: trisulphon violet 2B, Congo violet;
Brown dye: benzo deep brown NZ;
Black dye: cuprophenyl gray GRL.

4. A device as in claim 3 wherein the polarizing sheet are of a polymer material, preferably polyvinyl alcohol which exhibits a preferred direction induced by stretching.

5. A device as in claim 1 wherein the selective polarizer has one polarizing sheet in which are embedded at least two different dyes, of which at least one is dichroic.

6. A device as in claim 5 wherein the dichroic dye is at least one of the following listed dyes:

Blue dyes: benzo azurine G, direct brilliant blue C, trypan blue, Chicago blue RW, chlorantine deep blue 4 GL, Sirius super blue BL, Sirius super blue GL, solophenyl blue FGL, solophenyl brilliant blue BL, benzo copper deep blue F3GL, cuprophenyl blue GL, solophenyl marine blue ABL, benzo copper deep violet F3BL, indigo carmine, Levano light cyanine 5 RN, Janus green B, renol black;
Red dyes: Congo red, benzamine rubin RDG, Procion brilliant red M-2B, Maxilon brilliant red 4G, Biebrich scarlet;
Green dyes: benzo brilliant green L3G, dianil green B, chlorantine deep green BLL, Sirius super green BB, Sirius super green BTL, azo dark green;
Yellow dyes: benzo copper deep yellow GRL, durazol flavine F, diazol light yellow RS, solophenyl yellow A3GL, solophenyl yellow ARL, Maxilon yellow 3 GL, anthracene yellow C, solochrome orange GRS, Procion yellow M-4R;
Orange dyes: stilbene orange, Sirius orange G, cuprophenyl orange 3GL, benzo rubin R, benzo copper deep red GGL, benzo orange brown GR, methyl orange;
Violet dyes: trisulphon violet 2B, Congo violet;
Brown dye: benzo deep brown NZ;
Black dye: cuprophenyl gray GRL.

7. A device as in claim 6 wherein the polarizing sheets are of a polymer material, preferably polyvinyl alcohol which exhibits a preferred direction induced by stretching.

8. A device as in claim 1 wherein the selective polarizer has a polarizing sheet in which a dichroic dye is embedded.

9. A device as in claim 8 wherein the dichroic dye is at least one of the following listed dyes:

Blue dyes: benzo azurine G, brilliant blue C, trypan blue, Chicago blue RW, chlorantine deep blue 4 GL, Sirius super blue BL, Sirius super blue GL, solophenyl blue FGL, solophenyl brilliant blue BL, benzo copper deep blue F3GL, cuprophenyl blue GL, solophenyl marine blue ABL, benzo copper deep violet F3BL, indigo carmine, Levano light cyanine 5 RN, Janus green B, renol black;
Red dyes: Congo red, benzamine rubin RDG, Procion brilliant red M-2B, Maxilon brilliant red 4G, Biebrich scarlet;
Green dyes: benzo brilliant green L3G, dianil green B, chlorantine deep green BLL, Sirius super green BB, Sirius super Green BTL, azo dark green;
Yellow dyes: benzo copper deep yellow GRL, durazol flavine F, diazol light yellow RS, solophenyl yellow A3GL, solophenyl yellow ARL, Maxilon yellow 3 GL, anthracene yellow C, solochrome orange GRS, Procion yellow M-4R;
Orange dyes: stilbene orange, Sirous orange G, cuprophenyl orange 3GL, benzo rubin R, benzo copper deep red GGL, benzo orange brown GR, methyl orange;
Violet dyes: trisulphon violet 2B, Congo violet;
Brown dye: benzo deep brown NZ;
Black dye: cuprophenyl gray GRL.

10. A device as in claim 9 wherein the polarizing sheets are of a polymer material, preferably polyvinyl alcohol which exhibits a preferred direction induced by stretching.

11. A device as in claim 1 wherein the dichroic dye is at least one of the following listed dyes:

Blue dyes: benzo azurine G, direct brilliant blue C, trypan blue, Chicago blue RW, chlorantine deep blue 4 GL, Sirius super blue BL, Sirius super blue GL, solophenyl blue FGL, solophenyl brilliant blue BL, benzo copper deep blue F3GL, cuprophenyl blue GL, solophenyl marine blue ABL, benzo copper deep violet F3BL, indigo carmine, Levano light cyanine 5RN, Janus green B, renol black;

Red dyes: Congo red, benzamine rubin FDG, Procion brilliant red M-2B, Maxilon brilliant red 4G, Biebrich scarlet;

Green dyes: benzo brilliant green L3G, dianil green B, chlorantine deep green BLL, Sirius super green BB, Sirius super green BTL, azo dark green;

Yellow dyes: benzo copper deep yellow GRL, durazol flavine R, diazol light yellow RS, solophenyl yellow A3GL, solophenyl yellow ARL, Maxilon yellow 3 GL, anthracene yellow C, solochrome orange GRS, Procion yellow M-4R;

Orange dyes: stilbene orange, Sirius orange G, cuprophenyl orange 3GL, benzo rubin R, benzo copper deep red GGL, benzo orange brown GR, methyl orange;

Violet dyes: trisulphon violet 2B, Congo violet;

Brown dye: benzo deep brown NZ;

Black dye: cuprophenyl gray GRL.

12. A device as in claim 11 wherein the polarizing sheets are of a polymer material, preferably polyvinyl alcohol which exhibits a preferred direction induced by stretching.

13. A method of producing a liquid crystal display device for the colored display of information with a reflector and a twisted nematic liquid crystal cell placed between a linear polarizer and a selective polarizer wherein the selective polarizer is disposed in front of the twisted nematic liquid crystal cell and the linear polarizer is disposed between the twisted nematic liquid crystal cell and the reflector comprising:

making a polarizing sheet of the selective polarizer by stretching a polyvinyl alcohol film in a cold water bath, embedding dichroic molecules in the polyvinyl alcohol film in a dye bath, and, drying the dichroic molecule embedded polyvinyl alcohol film.

14. A method as in claim 13 further comprising stretching the polyvinyl alcohol film up to seven times its original length over a period of about three hours in a device disposed in a cold water bath, immersing the device holding the film for up to five minutes in at least one dye bath with up to one weight percent of dichroic dye, rinsing the stretched film with distilled solvent, and drying the film in air.

* * * * *